United States Patent
Duhon et al.

(10) Patent No.: US 12,441,257 B2
(45) Date of Patent: Oct. 14, 2025

(54) MULTIPLE DEGREE OF FREEDOM CABLE CLAMP

(71) Applicant: GM GLOBAL TECHNOLOGY OPERATIONS LLC, Detroit, MI (US)

(72) Inventors: Thomas K. Duhon, Ortonville, MI (US); Jeffrey Wyka, Clinton Township, MI (US); Douglas Lester Ziegelmann, II, East Tawas, MI (US); Alexandre Luis Taira, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 393 days.

(21) Appl. No.: 18/070,061

(22) Filed: Nov. 28, 2022

(65) Prior Publication Data

US 2024/0174187 A1 May 30, 2024

(51) Int. Cl.
*B60R 16/02* (2006.01)
*F16B 2/06* (2006.01)
*H02G 3/32* (2006.01)
*H02G 11/00* (2006.01)

(52) U.S. Cl.
CPC ............ *B60R 16/0215* (2013.01); *F16B 2/06* (2013.01); *H02G 3/32* (2013.01); *H02G 11/00* (2013.01)

(58) Field of Classification Search
CPC ... B60R 16/0215; B60R 16/0207; F16B 2/06; F16B 2/02; H02G 3/32; H02G 3/30; H02G 11/00
See application file for complete search history.

(56) References Cited

U.S. PATENT DOCUMENTS

| | | | | |
|---|---|---|---|---|
| 3,999,784 | A * | 12/1976 | Kennedy, Jr. ......... | E02F 9/2275 248/65 |
| 7,653,987 | B2 * | 2/2010 | Tokuda ............... | B60R 16/0215 29/748 |
| 9,879,802 | B2 * | 1/2018 | Getts .................... | F16L 3/12 |
| 11,142,143 | B2 * | 10/2021 | Okaniwa ............ | H02G 3/32 |
| 11,179,986 | B2 * | 11/2021 | Papafagos ......... | B60R 16/08 |
| 12,176,698 | B2 * | 12/2024 | Nunez ................ | F16L 3/22 |
| 2023/0311792 | A1 * | 10/2023 | Murata .............. | B60K 7/00 307/10.1 |

* cited by examiner

*Primary Examiner* — John D Walters

(57) ABSTRACT

A vehicle drive system includes a vehicle structure and a suspension system connected to the vehicle structure. An electric motor is mounted to the suspension system and includes a drive member. A wheel is drivingly connected to the drive member. At least two electric cables are connected to the electric motor. A cable clamp has a clamp body including a first portion and a second portion defining at least two apertures for receiving the at least two electric cables, the clamp body being pivotably mounted to the vehicle structure.

18 Claims, 2 Drawing Sheets

MULTIPLE DEGREE OF FREEDOM CABLE CLAMP

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a multiple degree of freedom cable clamp.

In electric vehicles, electric motors are commonly mounted to a wheel suspension system for providing drive torque to a hub of the wheel. The electric motor is supplied with electricity by two or more cables that are connected to a battery system. As the vehicle wheel experiences suspension travel, jounce and rebound, the electric motor moves with the wheel and the cables move with the electric motor.

In non-automotive applications, electric cables or hydraulic hoses can also be connected to a movable electric motor or a movable hydraulic motor or hydraulic system that require the mounting of electric cables or hydraulic hoses to a main structure.

SUMMARY

According to an aspect, a vehicle drive system includes a vehicle structure and a suspension system connected to the vehicle structure. An electric motor is mounted to the suspension system and includes a drive member. A wheel is drivingly connected to the drive member. One or more electric cables are connected to the electric motor. A cable clamp has a clamp body including a first portion and a second portion defining an aperture for receiving each of the electric cables, the clamp body being pivotably mounted to the vehicle structure.

According to a further aspect, the clamp body includes a Cardan-joint for pivotally mounting to the vehicle structure.

According to a further aspect, the suspension system includes a link arm and further comprising a link arm cable clamp mounted to the link arm and supporting the at least two electric cables.

According to a further aspect, the clamp body is mounted to the vehicle structure by a ball and socket joint.

According to a further aspect, the first portion and the second portion of the clamp body are secured to one another by at least one bolt.

According to a further aspect, the clamp body includes a mounting flange with an aperture and the aperture receives a pivot arm that is fixed to the vehicle structure.

According to a further aspect, the mounting flange is formed from an elastomeric material.

According to a further aspect, the clamp body is pivotally supported by a pivot body that is pivotally supported to the vehicle structure.

According to a further aspect, the pivot body includes a first aperture that receives a first pivot arm that is fixed to the vehicle structure, and the pivot body includes a second aperture that receives a second pivot arm that extends from the clamp body.

According to a further aspect, the clamp body is mounted to the vehicle structure by a swivel joint having a first rotational axis and a second rotational axis that is generally perpendicular to the first rotational axis.

According to another aspect, a cable clamp incudes a clamp body having a first portion joined to a second portion and defining at least two apertures configured to receive at least two electric cables, the clamp body including a pivot portion attached to the first portion.

According to a further aspect, the clamp body is connected to a swivel joint having a first axis of rotation and a second axis of rotation perpendicular to the first axis of rotation.

According to a further aspect, the clamp body is connected to a ball and socket joint.

According to a further aspect, the first portion and the second portion of the clamp body are secured to one another by at least one bolt.

According to a further aspect, the clamp body includes a mounting flange with an aperture that pivotally receives a pivot arm configured to mount to a vehicle structure.

According to a further aspect, the mounting flange is formed at least partially from an elastomeric material.

According to a further aspect, the clamp body is pivotally connected to a pivot body that is configured to be pivotally connected to a vehicle structure.

According to a further aspect, the pivot body incudes a first aperture that is configured to receive a first pivot arm that is fixed to the vehicle structure, and the pivot body includes a second aperture that receives a second pivot arm that extends from the clamp body.

According to another aspect, a cable clamp includes a clamp body including a first portion joined to a second portion and defining at least two apertures configured to receive at least two electric cables. The clamp body includes a pivot portion attached to the first portion, wherein the clamp body includes a mounting flange with an aperture that pivotally receives a pivot arm configured to mount to a vehicle structure.

According to a further aspect, the mounting flange is formed at least partially from an elastomeric material.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
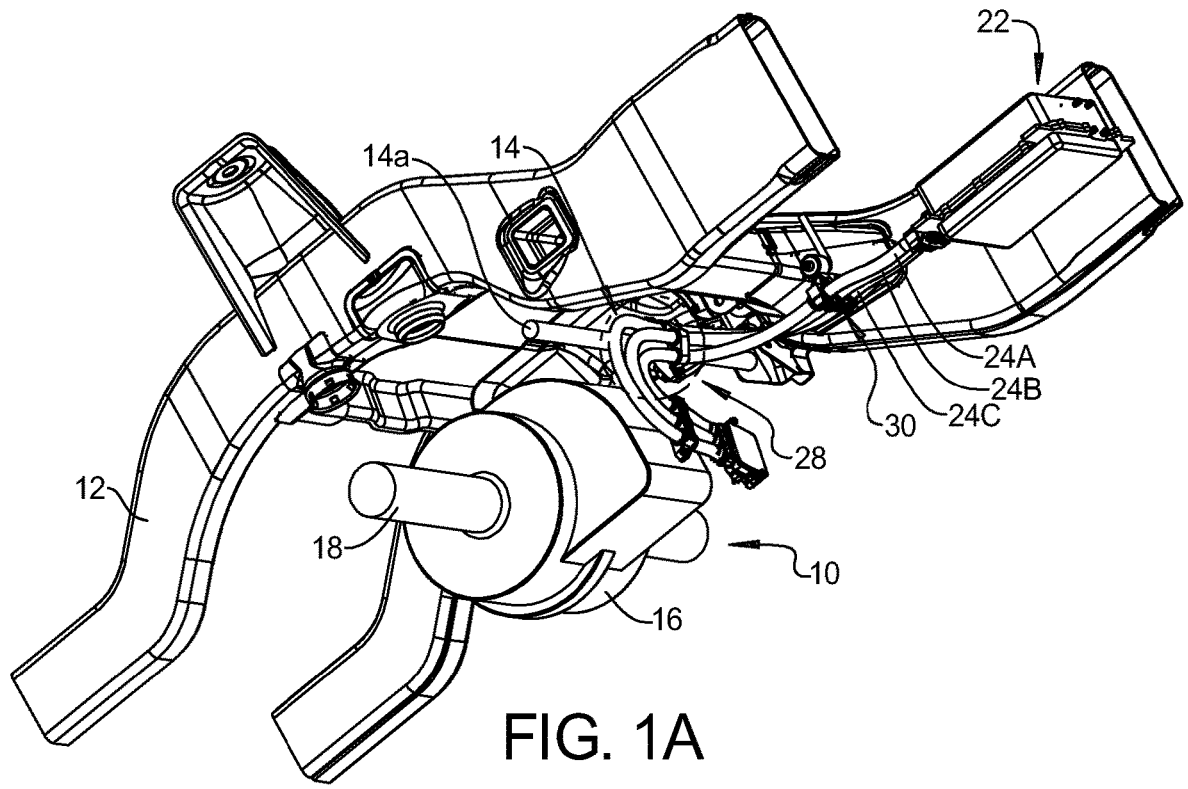
FIG. 1A is a perspective view of an example electric vehicle drive system utilizing a cable clamp according to the principles of the present disclosure.
Figure 1B:
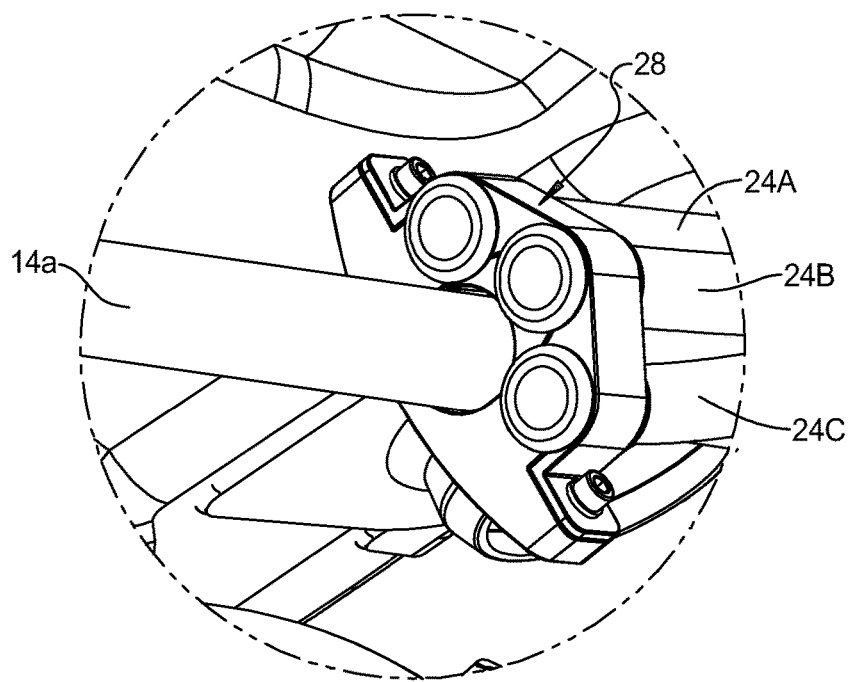
FIG. 1B is a perspective view of a cable clamp for engaging the cables to a suspension system link.

With reference to FIG. 1A-1B, an electric vehicle drive system 10 is shown including a vehicle structure 12 that can include a vehicle body or frame with a suspension system 14 connected to the vehicle structure 12. The suspension system 14 supports an electric motor 16 that is drivingly connected to a hub 18 of a vehicle wheel (not shown). The electric motor 16 is connected to a battery/inverter system 22 by at least two cables 24A-24C. The cables 24A-24C are supported to the vehicle structure 12 by a cable clamp 30 according to the principles of the present disclosure. As shown in FIG. 1B, a further cable clamp 28 can support the at least one cable 24A-24C to a link 14a of the suspension system. It should be understood that the example suspension system 14 can include a shock absorber and multiple links. It should be noted that alternative configurations of the suspension system 14 can be used. In non-automotive applications, electric cables, pneumatic tubes, or hydraulic tubes can also be connected to a movable electric motor, a movable electronic system, a movable pneumatic system, a movable pneumatic motor, a movable hydraulic motor, or other movable hydraulic system that require the mounting of electric cables or hydraulic hoses to a main structure. Accordingly, the clamps disclosed herein can be used for electric cables or hydraulic and pneumatic tubes.

Figure 2:
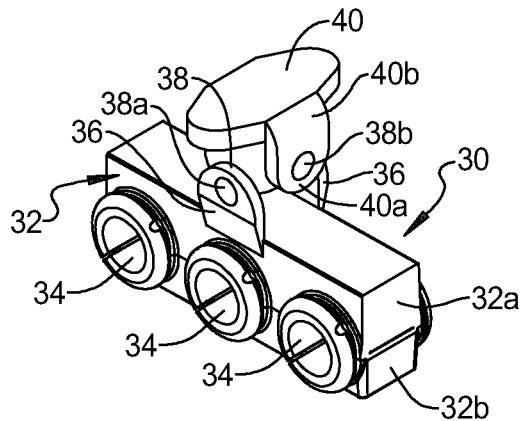
FIG. 2 is a perspective view of a cable clamp according to a first example embodiment of the present disclosure.

With reference to FIG. 2, a cable clamp 30 according to a first embodiment will now be described. The cable clamp 30 includes a clamp body 32 having a first portion 32a and a second portion 32b that can be bolted or otherwise clamped together. The first portion 32a and the second portion 32b define two or more apertures 34 (three are shown) for receiving the two or more cables 24A-24C therein. The first portion 32a of the clamp body 32 includes a pair of pivot flanges 36 which each include an aperture 36a for receiving a Cardan-joint 38. The Cardan-joint 38 includes a first pair of arms 38a that are received in the apertures 36a of the pivot flanges 36. The Cardan-joint 38 further includes a second pair of arms 38b that are received in respective apertures 40a in a pair of flanges 40b in a mounting base 40. The mounting base 40 can be mounted to the vehicle structure 12, as shown in FIG. 1. The first pair of arms 38a can be on an axis of rotation that is perpendicular to an axis of rotation of the second pair of arms 38b. Accordingly, the clamp body 32 is capable of pivotally moving about the axis of rotation along the first pair of arms 38a and further pivotally moving about the axis of rotation along the second pair of arms 38b when the suspension system 14 is moved.

Figure 3:
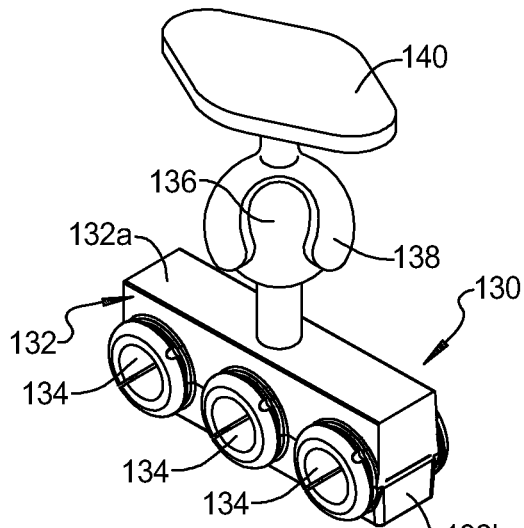
FIG. 3 is a perspective view of a cable clamp according to a second example embodiment of the present disclosure.

With reference to FIG. 3, a cable clamp 130 according to a second embodiment will now be described. The cable clamp 130 includes a clamp body 132 having a first portion 132a and a second portion 132b that can be bolted or otherwise clamped together. The first portion 132a and the second portion 132b define one or more apertures 134 (three are shown) for receiving the one or more cables 24A-24C therein. The first portion 132a, of the clamp body 132 includes one of a ball or socket 136 that is engaged with the other of the ball or socket 138 that is mounted to a mounting base 140. The mounting base 140 can be mounted to the vehicle structure 12, as shown in FIG. 1. The ball and socket connection between the clamp body 132 and the mounting base 140 allows the clamp body 132 to move with multiple degrees of freedom when the suspension system 14 is moved.

Figure 4:
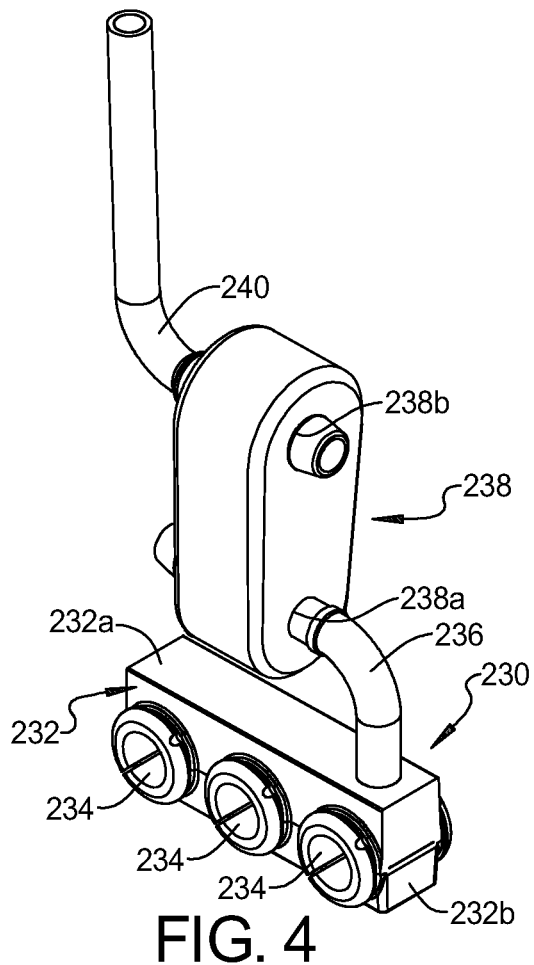
FIG. 4 is a perspective view of a cable clamp according to a third example embodiment of the present disclosure.

With reference to FIG. 4, a cable clamp 230 according to a third embodiment will now be described. The cable clamp 230 includes a clamp body 232 having a first portion 232a and a second portion 232b that can be bolted or otherwise clamped together. The first portion 232a and the second portion 232b define two or more apertures 234 (three are shown) for receiving the two or more cables 24A-24C therein. The first portion 232a of the clamp body 232 includes a pivot arm 236 that extends therefrom. The pivot arm 236 is received in a first aperture 238a in a pivot body 238. The pivot body 238 includes a second aperture 238b that receives a pivot arm 240 that is mounted to the vehicle structure 12. The pivot body 238 can be made from metal, plastic or an elastomeric material which could provide additional twist and flex to the cable clamp 230. The pivot arrangement between the clamp body 232 and the pivot body 238 as well as the pivot arrangement between the pivot body 238 and the pivot arm 240 of the vehicle structure 12 allows the clamp body 232 to move with multiple degrees of freedom when the suspension system is moved.

Figure 5:
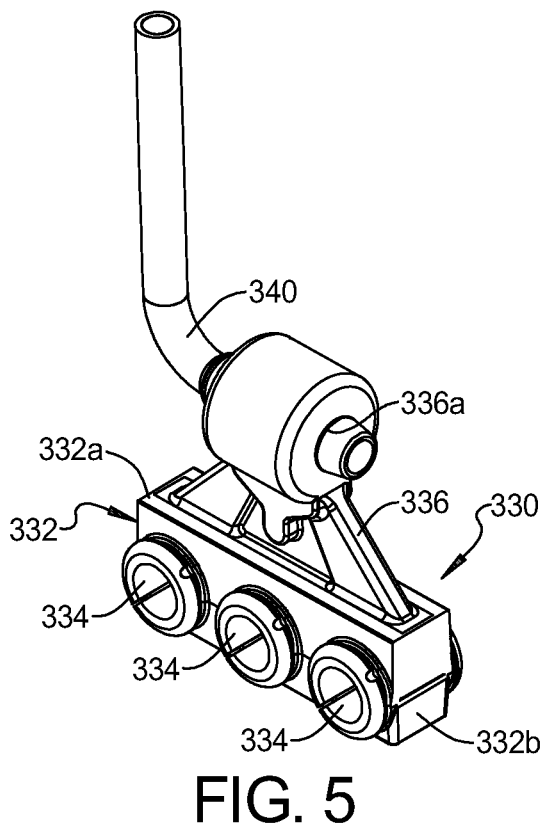
FIG. 5 is a perspective view of a cable clamp according to a fourth example embodiment of the present disclosure.

With reference to FIG. 5, a cable clamp 330 according to a fourth embodiment will now be described. The cable clamp 330 includes a clamp body 332 having a first portion 332a and a second portion 332b that can be bolted or otherwise clamped together. The first portion 332a and the second portion 332b define two or more apertures 334 (three are shown) for receiving the two or more cables 24A-24C therein. The first portion 332a of the clamp body 332 includes a flange portion 336 formed from an elastomeric material and having an aperture 336a therein. The aperture 336a receives a pivot arm 340 that is mounted to the vehicle structure 12. The pivot arrangement between the clamp body 332 and the pivot arm 340 as well as the flexible flange portion 334 made from elastomeric material allows the clamp body 332 to move with multiple degrees of freedom when the suspension system 14 is moved. It should be understood that the pivot arm 340 and the aperture 336a can be reversed so that the pivot arm is on the clamp body 332 and the aperture is formed on or is part of a mounting base that is connected to the vehicle structure 12.

Each of the cable clamps 30, 130, 230, 330 of the present disclosure accommodate movement of the cables or tubes 24, 26 when the suspension system 14 or other supporting structure is moved. Rather than rigidly securing the cables or tubes 24A-24C to the vehicle structure, the cable clamps 30, 130, 230, 330 pivot along with movement of the cables 24A-24C to reduce the strain on the cables hereby increasing the life expectancy of the cables. In addition, the addition of the cable clamp 28 that connects the cables to the suspension link 14a controls movement of the cables 24A-24C to move them along with the motor 16 and suspension link 14a further reducing the strain on the cables or tubes 24A-24C.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle drive system comprising:
    a vehicle structure;
    a suspension system connected to the vehicle structure;
    an electric motor mounted to the suspension system, the electric motor having a drive member;
    a wheel drivingly connected to the drive member;
    at least one electric cable connected to the electric motor; and
    a cable clamp having a clamp body including a first portion and a second portion defining at least one aperture for receiving the at least one electric cables, the clamp body being pivotably mounted to the vehicle structure via a base mounted to the vehicle structure and a pivot portion connected between the base and the clamp body.

2. The vehicle drive system according to claim 1, wherein the clamp body includes a Cardan-joint for pivotally mounting to the vehicle structure.

3. The vehicle drive system according to claim 1, wherein the suspension system includes a link arm and further comprising a link arm cable clamp mounted to the link arm and supporting the at least two electric cables.

4. The vehicle drive system according to claim 1, wherein the clamp body is mounted to the vehicle structure by a ball and socket joint.

5. The vehicle drive system according to claim 1, wherein the first portion and the second portion of the clamp body are secured to one another by at least one bolt.

6. The vehicle drive system according to claim 1, wherein the clamp body includes a mounting flange with an aperture and the aperture receives a pivot arm that is fixed to the vehicle structure.

7. The vehicle drive system according to claim 6, wherein the mounting flange is formed from an elastomeric material.

8. The vehicle drive system according to claim 1, wherein the clamp body is pivotally supported by a pivot body that is pivotally supported to the vehicle structure.

9. The vehicle drive structure according to claim 8, wherein the pivot body incudes a first aperture that receives a first pivot arm that is fixed to the vehicle structure, and the pivot body includes a second aperture that receives a second pivot arm that extends from the clamp body.

10. The vehicle drive system according to claim 1, wherein the clamp body is mounted to the vehicle structure by a swivel joint having a first rotational axis and a second rotational axis that is generally perpendicular to the first rotational axis.

11. A clamp, comprising:
    a clamp body including a first portion joined to a second portion and defining at least one aperture configured to receive at least one of a cable and a tube, the clamp body including a mounting base connected to the first portion of the clamp body by a pivot portion.

12. The clamp according to claim 11, wherein the pivot portion is connected to a Cardan-joint having a first axis of rotation and a second axis of rotation perpendicular to the first axis of rotation.

13. The clamp according to claim 11, wherein the pivot portion is connected to a ball and socket joint.

14. The clamp according to claim 11, wherein the first portion and the second portion of the clamp body are secured to one another by at least one bolt.

15. The clamp according to claim 11, wherein the pivot portion includes a mounting flange with an aperture that pivotally receives a pivot arm configured to mount to a vehicle structure.

16. The clamp according to claim 15, wherein the mounting flange is formed at least partially from an elastomeric material.

17. The clamp according to claim 11, wherein the mounting base is configured to be connected to a vehicle structure.

18. The clamp according to claim 17, wherein the pivot portion includes a pivot body with a first aperture that is configured to receive a first pivot arm that is fixed to the vehicle structure, and the pivot body includes a second aperture that receives a second pivot arm that extends from the clamp body.

* * * * *